No. 823,346. PATENTED JUNE 12, 1906.
E. L. MAXWELL.
PIPE FLANGE.
APPLICATION FILED OCT. 21, 1905.
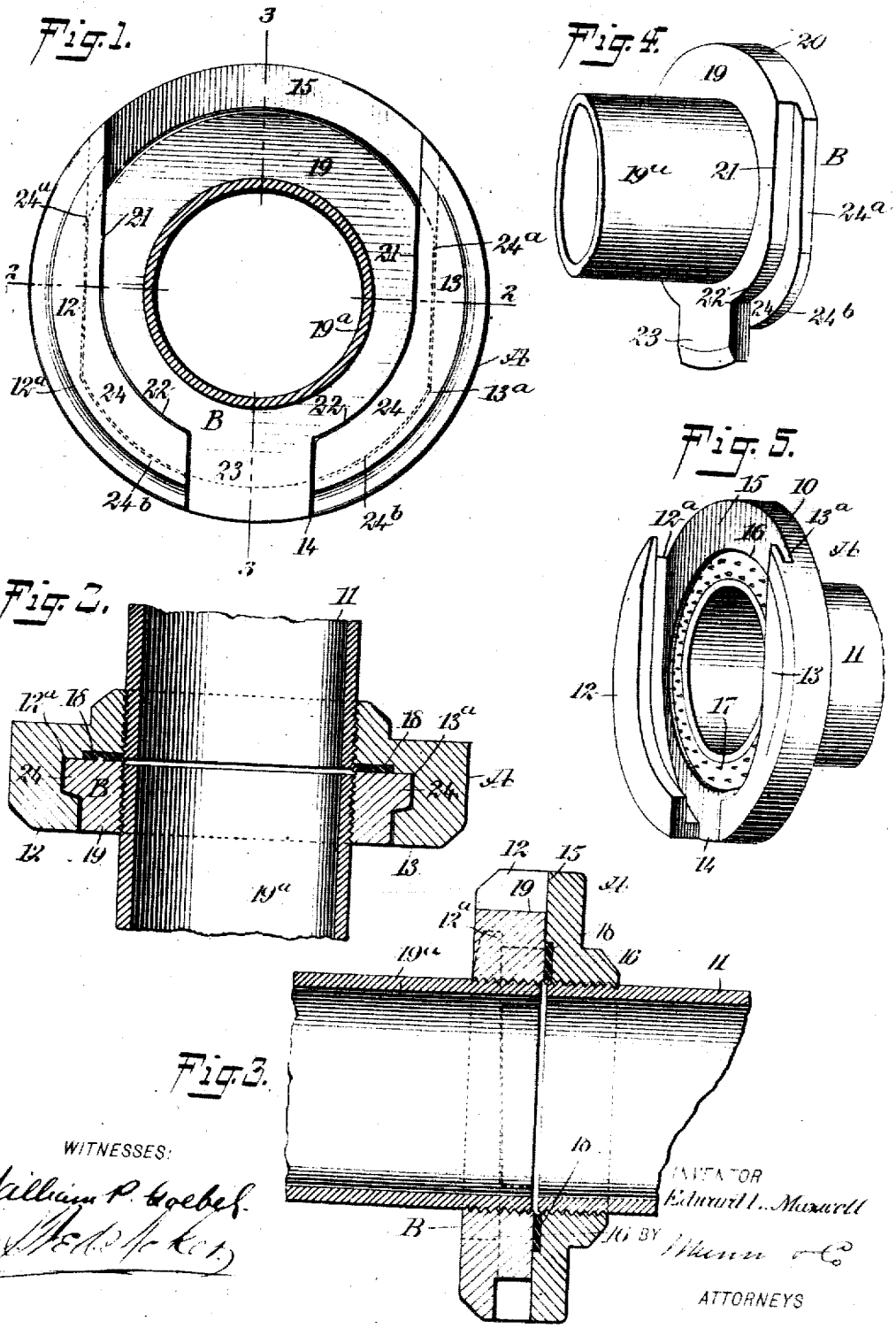

UNITED STATES PATENT OFFICE.

EDWARD LUDLOW MAXWELL, OF MULBERRY, FLORIDA.

PIPE-FLANGE.

No. 828,346.  Specification of Letters Patent.  Patented June 12, 1906.

Application filed October 21, 1905. Serial No. 283,848.

*To all whom it may concern:*

Be it known that I, EDWARD LUDLOW MAXWELL, a citizen of the United States, and a resident of Mulberry, in the county of Polk and State of Florida, have invented a new and Improved Pipe-Flange, of which the following is a full, clear, and exact description.

The purpose of the invention is to provide a flange adapted for connecting the ends of opposing pipes—as, for example, water, steam, or gas pipes—but which is adapted for use wherever a flange is needed, and to so construct the flange that it will be simple, durable, and economic and so that bolts or similar locking devices are not needed.

A further purpose of the invention is to provide a pipe-flange constructed in two sections—a male and a female section—and in such manner that they may be expeditiously and conveniently firmly keyed together and wherein the parts will not separate until purposely disconnected, which operation can be as conveniently accomplished as the act of connecting them.

Another purpose of the invention is to provide a gasket which engages with both sections and which is so firmly held by one section that it will be impossible for the gasket to blow out when the flange is used in steam-lines.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the improved flange, the pipe connected with the male section being shown in section. Fig. 2 is a horizontal section taken practically on the line 2 2 of Fig. 1. Fig. 3 is a vertical section taken substantially on the line 3 3 of Fig. 1. Fig. 4 is a perspective view of the male section and a portion of a pipe connected therewith, and Fig. 5 is a perspective view of the female section and attached pipe.

A represents the female section of the flange, and B the male section thereof. The female section A comprises a ring body 10, of suitable width and depth, and the end of a pipe 11 is screwed or otherwise secured at the central opening in the body. Wings 12 and 13 are provided at the front face of the body, a wing being at each side edge of the body, and the said wings 12 and 13 are so offset from the front face of the body 10 as to provide between said front face of the body and opposing faces of the wings downwardly-tapering grooves or channels $12^a$ and $13^a$. These grooves or channels $12^a$ and $13^a$ are straight from their upper ends for a portion of their length; but their lower portions are more or less curved, the curvature corresponding to that of the body.

The upper portions of the wings are straight and their lower portions are curved, and a space 14 intervenes between the wings at their lower ends, said space 14 being at the central lower portion of the body 10, and at the central upper portion of the said body a wider space 15 intervenes between the upper ends of the wings, as is clearly shown in Figs. 1 and 5. A recess 16 is produced in the front face of the body 10 around the opening in which the pipe 11 is entered, and at this recess a series of pins 17 or their equivalents are secured, and the said recess 16 is adapted to receive a gasket 18, as is shown in Figs. 2 and 3, the pins 17 effectually preventing the gasket 18 from moving from its position in the said female member.

The male section B consists of a body 19, which is adapted to fit between the wings 12 and 13 of the female section and to slide into the grooves or channels $12^a$ and $13^a$ of the said female section, as is shown in Figs. 1, 2, and 3. The body 19 of the male section B is provided with an upper convexed edge 20, straight side edges 21, and lower convexed side edges 22, which join a centrally-located downwardly-extending locking-lip 23, whose side walls are straight, and the front face of the lip 23 is in the same plane with the front face of the body 19. A downwardly-tapering or wedge-shaped tongue 24 is formed at the side rear portion of the said body 19, extending from the top at each side downward in straight sections $24^a$ and along the lower side edge and the bottom at the rear of the lip 23 in a convexed or grooved section $24^b$. The rear face of the tongue 24 is in the same plane with the back or inner face of the body 19. The pipe $19^a$ is made to enter a central opening in the body 19, which opening extends through from the front to the rear, and the said pipe is screwed into the wall of the said opening or is otherwise attached thereto.

When the two sections of pipe 11 and $19^a$ are to be connected through the medium of the improved flange, the male section of the flange is elevated until it can be readily entered into the female section at the upper space 15, whereupon the tongue 24 will slide into and snugly fit to the grooves or channels 12ª and 13ª and the side edges of the body proper will fit snugly to the inner contours of the wings 12 and 13, as these two portions are correspondingly formed, while the lip 23 will enter and snugly fit into the lower space 14 in the female section, as is clearly shown in Fig. 1, and the gasket 18 will be in engagement with the inner faces of both the male and the female sections, as is shown in Figs. 2 and 3. Under this construction of the flange it is evident that a coupling can be quickly and conveniently made and that when the coupling is accomplished the two parts of the flange will remain firmly locked together until purposely removed. It is obvious that no screws, bolts, or other locking devices are needed and that the male section may be firmly seated in the female section by the tap of a hammer or other suitable tool.

Having thus described my invention, I claim as new and desire to secure by Letters Patent—

1. As an improved article of manufacture, a pipe-flange comprising a male and a female section, both sections having an opening for the reception of a pipe, one section being provided at its inner face with a recess around the pipe-receiving opening, pins at the said recessed portion, and a gasket fitted in the said recess and engaging with the pins, the female section having side grooved wings spaced at the top and at the bottom, the male section being shaped to fit between the wings of the female section and provided with a marginal tongue to enter the grooves of the said wings, the male section being also provided with a lip which enters the lower space between the wings.

2. A pipe-flange, comprising a male and a female section, the female section consisting of a ring body having side wings at its front face and grooves in the inner faces of the said wings, the upper portions of the grooves being straight and the lower portions curved, spaces intervening between the upper and the lower portions of the wings, the said body of the female section being also provided with a recess for the reception of the gasket, the male section comprising a body having straight side edges, rounded lower edges and a downwardly-extending lower lip centrally located, the said body being likewise provided with an opening to receive a pipe and said body being also provided with a marginal lip having straight sides and rounded lower ends, the lower portions of the tongues being at the rear of the said lip, the tongues being adapted to the grooves in the female section and the body being adapted to fit between the wings of the said female section while the lip extends through the lower space between the wings.

3. In a flange for pipes, the combination with a female section comprising a disk body having an opening for the reception of a pipe and a recess in its front face around the said opening and pins in the recessed portion of the body, the said body being further provided with a gasket engaging the pins and with front wings at its sides, which wings are provided with downwardly-tapering grooves in their inner faces, having straight upper sections and curved lower sections, the inner faces of the wings being correspondingly formed, the said body being likewise provided with spaces between the wings at its top and bottom, of a male section comprising a body having an opening to receive a pipe, which body is provided with straight walls at its upper portion and with convexed side walls at its lower portion, the convexed side walls meeting a downwardly-extending lip and the said body being also provided with a downwardly-tapering or wedge-shaped marginal tongue at its rear portion, the upper portions of which tongue are straight and the lower portions convexed, the said body being adapted to fit into the space between the wings, the tongues to enter the grooves in the female section and the lip to enter the lower space between the wings of the female section, substantially as described.

In testimony whereof I have signed my name to this specification in the presence of two subscribing witnesses.

EDWARD LUDLOW MAXWELL.

Witnesses:
A. S. McKILLOP,
H. N. COLLINS.